United States Patent Office 2,791,491
Patented May 7, 1957

---

2,791,491

PROCESS FOR THE MANUFACTURE OF HYDROGEN PEROXIDE

Kenneth Michael Hack, Almondsbury, Bristol, and William Stanley Wood, Harpenden, England, assignors to Laporte Chemicals Limited, London, England, a British company No Drawing. Application September 16, 1953, Serial No. 380,618

Claims priority, application Great Britain September 19, 1952

9 Claims. (Cl. 23—207)

This invention relates to an improved process for the manufacture of hydrogen peroxide.

It is well known that hydrogen peroxide is formed by the autoxidation of certain organic compounds. The organic compounds formed in the autoxidation are reduced in any known manner to reform the original organic compound; the process can thus be made cyclic. The organic compound, e. g. an anthraquinhydrone or anthrahydroquinone derivative, can be autoxidised in a mixture of two solvents, one being a solvent for the anthraquinhydrone or anthrahydroquinone and the other a solvent for the anthraquinone. Various solvent mixtures have been proposed and United Kingdom specification No. 465,070, for example, discloses amyl alcohol, cyclohexanol and methyl cyclohexanol as solvents for the anthrahydroquinone with benzene as solvent for the anthraquinone. United Kingdom specification No. 508,881 mentions the same solvents. United Kingdom specification No. 669,274 discloses a mixed solvent the constituent for the anthrahydroquinone being a di-substituted organic ester of phosphonic acid and United Kingdom specification No. 671,524 also discloses a solvent mixture, the component for the anthrahydroquinone being a tri-substituted organic ester of phosphoric acid. In both cases benzene is the solvent for the anthraquinone. On the other hand, U. S. Patent No. 2,455,238 discloses the use of dibutyl sebacate as a single solvent.

It has now been found according to this invention that esters of phthalic acid, particularly the dialkyl or diaryl esters, may be used as single solvents for both the quinone and quinhydrone or hydroquinone types of the alkylated anthraquinones.

Accordingly the process of the present invention provides a cyclic process for the manufacture of hydrogen peroxide by the autoxidation of an anthraquinhydrone or anthrahydroquinone in a solvent comprising an ester of phthalic acid preferably an alkyl or aryl ester with subsequent removal of the hydrogen peroxide formed, followed by the reduction of the anthraquinone formed to the anthraquinhydrone or anthrahydroquinone which is again autoxidised.

We prefer to use a dialkyl or diaryl ester of phthalic acid which has a melting point of not more than 50° C. When the ester is not a liquid at room temperature it is, of course, necessary to work the process at a correspondingly higher temperature in order that the ester is a liquid throughout the process.

The use of a single solvent for both the quinone and quinhydrone or hydroquinone forms results in a number of advantages as compared with a mixture of solvents. Thus, it is no longer necessary to use a highly inflammable constituent for the anthraquinone component. Also these esters possess the requisite solvent power both for the quinone and quinhydrone or hydroquinone forms and both oxidation and reduction can be carried out at relatively high concentrations. Also, no substantial change in the composition of the solvent can occur. The oxidation reaction is carried out with a minimum of direct oxidation of the solvent as the dialkyl or diaryl esters of phthalic acid are chemically stable. As previously stated the fire and explosion hazard is removed as these esters have a very high flash point. Owing to the low solubility in water of these esters there is a minimum loss of solvent during extraction of the peroxide.

Examples of esters suitable for use in the process of the present invention are as follows:

Di-butyl phthalate
Di-methyl phthalate
Di-amyl phthalate
Di-(ethyl-hexyl) phthalate
Di-(ethylene glycol monobutyl ether) phthalate
Di-benzyl phthalate
Benzyl-butyl phthalate One method of assessing the value of a solvent for use in the process of the present invention is to determine the solubility of a reduced form of the quinone in the solvent. A number of the solvents employed in the present invention were tested in this way as follows: Solutions containing 100 gms./litre or less of 2-ethyl-anthraquinone in the solvent under test were hydrogenated in the presence of a catalyst consisting of palladium supported on activated alumina until a precipitate of 2-ethyl-anthraquinhydrone was just formed. After standing for 24 hours at 30° C. the precipitate and catalyst were filtered off and the concentration of the 2-ethyl-anthraquinhydrone remaining in the solvent was determined.

Results for a number of phthalic acid esters are given in the table, in which the quinhydrone solubility is expressed as the equivalent hydrogen peroxide concentration at 30° C.:

| Solvent | Quinhydrone solubility as gms./litre of equivalent $H_2O_2$ | 2-ethyl-anthraquinone component in gms./litre |
| --- | --- | --- |
| Di-methyl phthalate | 3.0 | 100 |
| Di-butyl phthalate | 4.6 | 70 |
| Di-amyl phthalate | 3.2 | 50 |
| Di-ethyl hexyl phthalate | 1.8 | 50 |
| Benzyl butyl phthalate | 2.5 | 80 |

In all cases, the solubility of 2-ethyl-anthraquinone in these solvents was greater than 50 gms./litre.

Hydrogen peroxide is recovered from the oxidised organic solution by extraction with water in a countercurrent system, for example a conventional plate column. The ease of extraction of the hydrogen peroxide is influenced by the partition coefficient of hydrogen peroxide between water and the organic solution, and this also decided the maximum concentration of hydrogen peroxide which may be achieved in the aqueous layer. This partition coefficient was determined for a number of these solvents in the following way:

Portions of solutions containing 100 gms./litre or less of 2-ethyl-anthraquinone in four of the above-mentioned solvents were shaken with an equal volume of 15% aqueous hydrogen peroxide at 25° C. until equilibrium was reached. The two phases were then separated and the hydrogen peroxide concentration in each determined. The partition coefficient of hydrogen peroxide between the two phases was then calculated by dividing the concentration in the aqueous phase by the concentration in the organic phase.

The maximum concentration of hydrogen peroxide which could theoretically be achieved in the aqueous phase was then calculated by multiplying the partition coefficient by the hydrogen peroxide concentration equivalent to the quinhydrone solubility and the following results were obtained:

| Solvent | Partition Coefficient | Maximum $H_2O_2$ concentration in the extract (gms./litre) | 2-ethyl-anthraquinone component in gms./litre |
|---|---|---|---|
| Di-methyl phthalate | 16 | 48 | 100 |
| Di-butyl phthalate | 66 | 305 | 70 |
| Di-amyl phthalate | 85 | 270 | 50 |
| Di-ethyl hexyl phthalate | 225 | 400 | 50 |

In practice it would not be possible to achieve these maximum hydrogen peroxide concentrations with all the solvents, as in some cases the specific gravity of the extract becomes equal to that of the solution being extracted, and the two phases cannot be separated. In these cases it is therefore necessary to keep the extract at a concentration below the maximum. In order to achieve a high efficiency of extraction, i. e. nearly complete transfer of the hydrogen peroxide to the aqueous phase, it is normally necessary to keep the extract at a concentration below the maximum; to achieve a concentration approaching the maximum would require excessively complicated apparatus for the extraction process. This is, therefore not necessarily a disadvantage of these particular solvents.

Specific gravities of the solutions mentioned above, at 20° C., are:

| Solvent | 2-ethyl-anthraquinone concentration (gms./litre) | Specific Gravity |
|---|---|---|
| Di-methyl phthalate | 100 | 1.187 |
| Di-butyl phthalate | 70 | 1.052 |
| Di-amyl phthalate | 50 | 1.03 |
| Di-ethyl hexyl phthalate | 50 | 0.99 |

As the solution in di-methyl phthalate is of greater specific gravity than the extract of maximum extract, and that in di-ethyl hexyl phthalate is below that of water, the concentration needs to be restricted in this way and for this reason only in the case of the other two solvents. The hydrogen peroxide solutions with specific gravity equal to that of these organic solutions are, for di-butyl phthalate 195 gms./litre and for di-amyl phthalate 105 gms./litre.

An additional advantage in the use of the phthalates according to the present invention is that owing to their low vapour pressure no expensive process is necessary for recovery of solvent from any gases which have been blown through the solution at any stage of the process.

The following examples illustrate how the process of the present invention may be carried into effect:

1. A 6% w./v. solution of 2-ethyl anthraquinone in di-butyl phthalate (B. S. 573) was made. This solution was hydrogenated with hydrogen in the presence of a palladium catalyst at 20° C. for 1 hour to give 100% conversion of the 2-ethyl anthraquinone to the 2-ethyl anthraquinhydrone. After separation from the catalyst the quinhydrone solution was autoxidised by blowing air through it, reforming the quinone with simultaneous formation of hydrogen peroxide. The hydrogen peroxide was then extracted from the solution with water and the recovery of hydrogen peroxide was over 90%.

2. A 5% w./v. solution of 2-ethyl anthraquinone in di-amyl phthalate was made. This solution was hydrogenated with hydrogen in the presence of a palladium catalyst at 30° C. to give 90% conversion of the 2-ethyl anthraquinone to the 2-ethyl anthraquinhydrone. After separation from the catalyst the quinhydrone solution was autoxidised by blowing air through it, reforming the quinone with simultaneous formation of hydrogen peroxide. The hydrogen peroxide was then extracted from the solution with water and the recovery of hydrogen peroxide was over 90%.

3. A 5% w./v. solution of 2-ethyl anthraquinone in di-(ethyl-hexyl) phthalate was made. This solution was hydrogenated with hydrogen in the presence of a palladium catalyst at 30° C. to give 50% conversion of the 2-ethyl anthraquinone to the 2-ethyl anthraquinhydrone. After separation from the catalyst the quinhydrone solution was autoxidised by blowing air through it, reforming the quinone with simultaneous formation of hydrogen peroxide. The hydrogen peroxide was then extracted from the solution with water and the recovery of hydrogen peroxide was over 90%.

4. A 10% w./v. solution of 2-ethyl anthraquinone in di-methyl phthalate was made. This solution was hydrogenated with hydrogen in the presence of a palladium catalyst at 30° C. to give 42% conversion of the 2-ethyl anthraquinone to the 2-ethyl anthraquinhydrone. After separation from the catalyst the quinhydrone solution was autoxidised by blowing air through it, reforming the quinone with simultaneous formation of hydrogen peroxide. The hydrogen peroxide was then extracted from the solution with water and the recovery of hydrogen peroxide was over 90%.

While the invention has been described more particularly with reference to the use of 2-ethyl anthraquinone it will be understood that it is applicable to alkyl and aryl substituted anthraquinones in general, e. g., butyl-anthraquinones.

What we claim is:

1. A cyclic process for the manufacture of hydrogen peroxide which comprises subjecting a solution of an anthraquinone in a di-ester of phthalic acid selected from the group consisting od dialkyl phthalates, diaryl phthalates and alkyaryl phthalates to reduction to produce a reduced compound selected from the group consisting of the corresponding anthraquinhydrone and the corresponding anthrahydroquinone, autoxidizing said reduced compound to form hydrogen peroxide and reform said anthraquinone, extracting said hydrogen peroxide from the solution with an aqueous solvent, and again reducing the anthraquinone in the solution.

2. A cyclic process for the manufacture of hydrogen peroxide as claimed in claim 1 wherein said ester is a dialkyl ester of phthalic acid which has a melting point below 50° C.

3. A cyclic process for the manufacture of hydrogen peroxide as claimed in claim 1 wherein said ester is a diaryl ester of phthalic acid which has a melting point below 50° C.

4. A cyclic process for the manufacture of hydrogen peroxide as claimed in claim 1 wherein said anthraquinone is 2-ethyl-anthraquinone.

5. A cyclic process for the manufacture of hydrogen peroxide as claimed in claim 1 wherein said ester is di-butyl phthalate.

6. A cyclic process for the manufacture of hydrogen peroxide as claimed in claim 1 wherein said ester is di-(ethyl-hexyl) phthalate.

7. A cyclic process for the manufacture of hydrogen peroxide as claimed in claim 1 wherein said ester is di-methyl phthalate.

8. A cyclic process for the manufacture of hydrogen peroxide as claimed in claim 1 wherein said ester is di-benzyl phthalate.

9. A cyclic process for the manufacture of hydrogen peroxide as claimed in claim 1 wherein said ester is di-(ethylene glycol monobutyl ether) phthalate.

(References on following page)

References Cited in the file of this patent

UNITED STATES PATENTS

| | | |
|---|---|---|
| 2,059,569 | Filson et al. | Nov. 3, 1936 |
| 2,455,238 | Dawsey et al. | Nov. 30, 1948 |
| 2,537,655 | Dawsey et al. | Jan. 9, 1951 |

OTHER REFERENCES

Bretscher et al.: "Concentrated Hydrogen Peroxide," preprint 92–36, Electrochemical Society (1947).